UNITED STATES PATENT OFFICE.

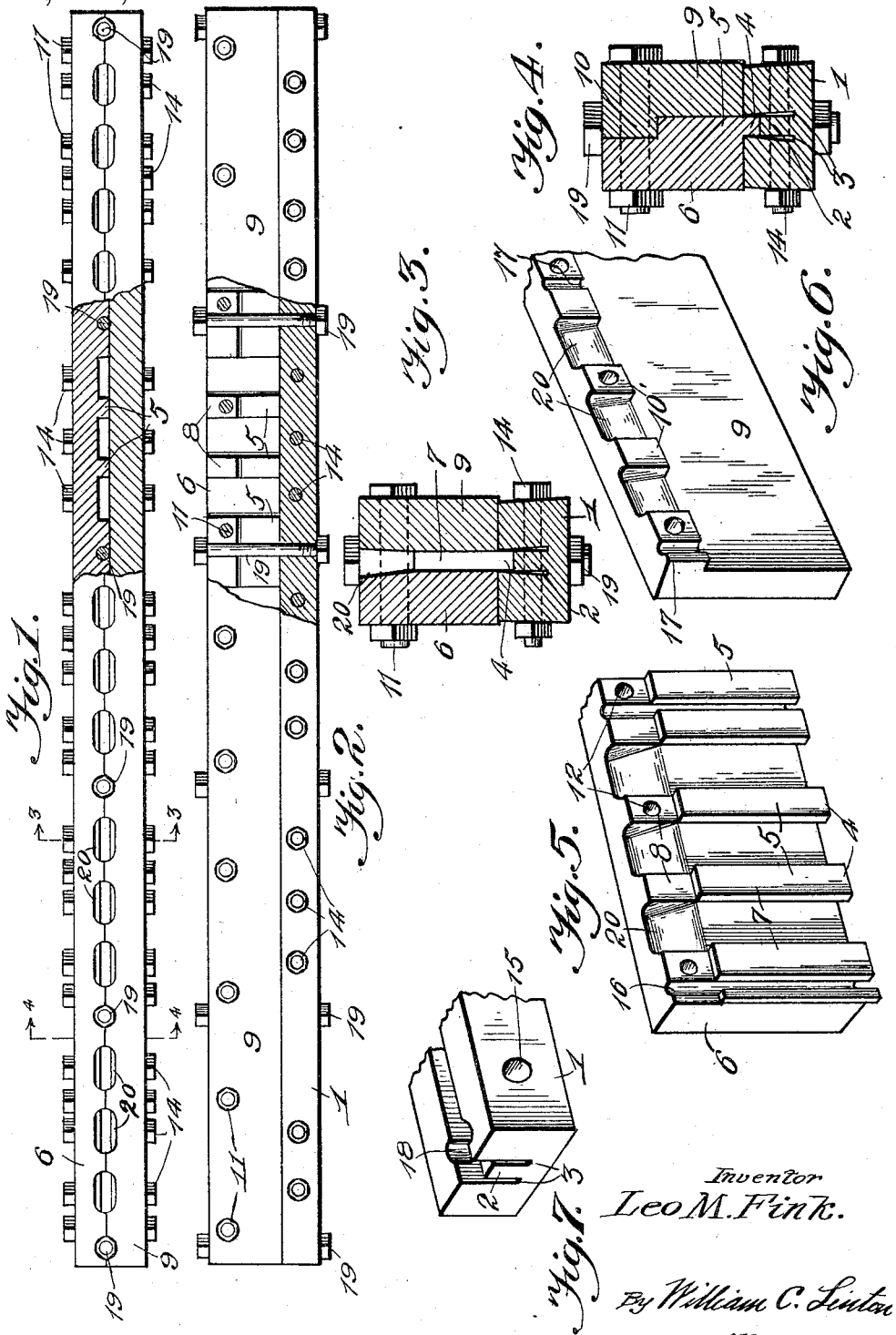

LEO M. FINK, OF MONTREAL, QUEBEC, CANADA.

MOLD FOR MAKING INDIVIDUAL TEETH FOR DIAMOND SAWS.

1,210,292.      Specification of Letters Patent.      Patented Dec. 26, 1916.

Continuation of application Serial No. 42,439, filed July 28, 1915. This application filed April 17, 1916. Serial No. 91,834.

*To all whom it may concern:*

Be it known that I, LEO M. FINK, a citizen of the United States, residing at Montreal, in the Province of Quebec, Canada, have invented new and useful Improvements in Molds for Making Individual Teeth for Diamond Saws, of which the following is a specification.

The present invention relates to molds for molding teeth of stone saws of the type employing abrasive material, such as black or Brazilian diamonds and the present application is a continuation of my application filed July 28, 1915, Serial Number 42,439. As is well known such teeth are formed by molding them with abrasive material in their cutting edges.

The object of the invention is to provide a mold of the character aforesaid for forming a plurality of teeth, each tooth being formed independently of the other teeth and for molding very small pieces of abrasive material in their cutting edges, such as diamonds or broken pieces of diamonds or diamond chips, carborundum or other suitable abrasive material, thereby producing teeth having a relatively large number of closely arranged cutting points.

A further object of the invention is to provide a durable and compact mold for casting teeth of the character aforesaid of simple construction and operation which renders it possible to cast a number of teeth independently of each other, so that they do not have to be cut apart and then dressed to remove the web of metal which formerly connected them, as is done at present where a number of teeth are cast at the same time.

With the above and other objects in view which will hereinafter appear as the description continues, the invention consists of the novel features of construction and the formation of parts as will be hereinafter more fully described and particularly pointed out in the appended claims.

In the accompanying drawings is shown the simple and preferred form of the invention it being, however, understood that no limitation is necessarily made to the precise structural details herein exhibited but the right is hereby reserved to any changes or alterations that may be had and come within the scope of the invention without departing from the spirit thereof or sacrificing the efficiency of the same.

In the drawings; Figure 1 is a plan view showing part thereof in section illustrating the mold embodying the present invention; Fig. 2 is a side elevation of the same having a part thereof in section; Fig. 3 is a vertical section taken on the line 3—3 of Fig. 1; Fig. 4 is a vertical section taken on the line 4—4 of Fig. 1; Fig. 5 is a detail perspective view of one of the side blocks; Fig. 6 is a detail perspective view of the other side block; and Fig. 7 is a detail perspective view of the base block.

Referring now more particularly to the drawing wherein like and corresponding parts are designated by similar reference characters throughout the several views the numeral 1 designates the base block of the mold which is provided with a central longitudinal channel about one-fourth of an inch deep and slightly over $\frac{11}{32}$ of an inch wide. Vertical cuts extend down each side of the channel forming a central tongue 2 connected to the body of the base block by heavy web portions 3 so as to form a spring connection which will permit a certain give in the side pieces of the block.

The channel of the base block receives the depending ends 4 of the equally spaced ribs 5 formed integral on the inner face of the side block 6. The lower ends of the ribs 4 which fit into the channel of the base block are $\frac{11}{32}$ of an inch in thickness, slightly narrower than the channel in its normal condition. The remainder of the rib is $\frac{1}{4}$ of an inch in thickness as at 7. The ribs extend adjacent to the top of the block leaving the space 8 thereabove. The ribs 5 are adapted to fit snugly against the inner face of the second block 9 provided at its upper edge with a plurality of equally spaced lugs 10 adapted to fit snugly over the tops of the ribs 5 and rest within the spaces 8 thereby forming a continuation of the ribs 5 for forming partitions throughout the mold.

By having the cutting end of the teeth thicker than the body portion a good clearance is given to the body portion. This has two important results; contact of the body of the tooth with the sides of the cut being made is avoided which greatly reduces the friction and results in a great saving in the power required to drive the saw, also, the arras or edge of the cut is kept smooth and clear due to the fact that it is not battered or worn by the body portion of the tooth.

In assembling the mold the side blocks 6 and 9 are connected together by means of the bolts 11 extending through the apertures 12 and 13 formed within the side blocks 6 and 9 respectively. The depending web portions 4 are inserted within the channelway of the base block and the side blocks thereby rest upon the base block. The bolts 14 are inserted through the openings 15 within the base block and when these bolts are tightened the sides of the base block are drawn together until they grip the depending webs 4 of the side block and thereby retain the side blocks in position upon the base block and the web 2 within the base block acts as a stop to limit the inward movement of the sides of the base block so that the channelway within the base block will attain the same width as the ribs 5 or the cavity which is formed by connecting the side blocks together. Vertically arranged recesses 16, 17 and 18 are formed within the side blocks and base block respectively providing bores when the blocks are assembled together whereby the vertical bolts 19 may be inserted therethrough and the blocks connected together to prevent their separation when pouring the molten steel within the chambers formed within the blocks.

When the mold has been assembled as above described molten steel is poured between the ribs 4 to the height of the ribs, the faces of the side blocks between the ribs being given an outward flare as at 20 to form funnel-like entrances to the spaces between the ribs to facilitate the pouring operation. As soon as the steel has set sufficiently the bolts 14 are loosened slightly and then removed and then the bolts 11 and 19 are loosened so that the bolts may be removed and the sections of the mold taken apart. This releases the teeth between the ribs which may be readily removed from the channel of the base block. These teeth which are cast entirely separate from each other due to the absolute separation of the casting chambers of the mold, may be easily and quickly removed from their mold and are ready for use without the usual machining and brazing necessary where the teeth are cast together.

The abrasing material such as diamonds may be inserted within the channel of the base block in proper position as described in my copending application Serial Number 91835, filed April 17, 1916 so that when the teeth are cast the abrasive material will also be cast therewith.

Having thus fully described my invention, what I claim as new and desire to secure by Letters Patent is:

1. A mold for saw teeth comprising a sectional frame consisting of side blocks and a base block and means for contracting the base block whereby one of said side blocks will be connected thereto.

2. A mold for saw teeth comprising a sectional frame consisting of separable side blocks and a detachable base block, means for connecting the side blocks together and a flexible connection between one of the side blocks and the base block whereby the side blocks will be held in position upon the base block.

3. A mold for forming individual saw teeth comprising a sectional frame consisting of two separable side blocks and a base block adapted to be detached therefrom and means for contracting the side walls of the base block together whereby one of the side blocks will be connected thereto.

4. A mold for saw teeth comprising a sectional frame consisting of side blocks and a base block, means for connecting the side blocks together, ribs depending from one of the side blocks and means whereby said ribs will be frictionally held within the base block.

5. A mold of the character described, comprising side blocks and a base block adapted to coöperate with each other to form a plurality of independent chambers, means for securing the side blocks together and coupling means formed integral with the base block for detachably connecting the side blocks thereto.

6. In a mold of the character described, a channeled base block, a side block provided with a plurality of ribs formed integral with one face thereof, said ribs depending from said side block and adapted to rest within the channel of the base block, a second side block adapted to be secured to the first side block, and the base block adapted to grip said ribs whereby the side blocks will be held in proper position upon the base block.

7. A mold of the character described comprising a channeled base block and side blocks, ribs depending from one of the side blocks and adapted to rest within said channel, and means for causing the side walls of said channel to grip said ribs for the purpose set forth.

8. A mold of the character described comprising a channeled base block and a plurality of side blocks, said side blocks adapted to rest upon the upper face of the base block, the outer sides of said base block adapted to normally rest flush with the outer sides of the base block, ribs depending from one of the side blocks, the width of said ribs being slightly less than the width of said channel within the base block and adapted to rest within the same and means for causing the side walls of said channel to lie closely adjacent the depending ribs of said side block.

9. A mold of the character described comprising a channeled base block, a web arranged within said channel and being of less width than the width of the channel, side blocks adapted to be connected together, ribs depending from one of the side blocks and adapted to rest within said channel, and means for causing the opposite walls of the base block around said channel to be forced into a gripping engagement with said ribs.

10. A mold of the character described comprising a channeled base block, a web arranged within the channel and the base block and formed integral with the base block, side blocks adapted to rest upon said base block, a plurality of ribs extending from one of the side blocks and adapted to rest within said channel, and means for causing the base block to grip said ribs for the purpose set forth.

11. A mold of the character described comprising a channeled base block and side blocks adapted to be connected together, said side blocks forming a plurality of independent chambers adapted to register with the channel within the base block, the channel within the base block being normally of greater width than the lower ends of the chambers formed between the side blocks, the medial portion of the chambers within the side blocks being of less width than the lower portion of said chambers and the upper ends of said chambers being flared outwardly for the purpose set forth.

12. A mold of the character described comprising a channeled base block, and side blocks adapted to be connected thereto, ribs formed integral with one face of one of the side blocks and depending from the lower end thereof to rest within the channel of the base block, the other side block having ribs formed integral therewith adjacent the upper end thereof and adapted to rest upon the ribs of the other side block, means for connecting the blocks together for forming a plurality of independent chambers adapted to register with the channel within the base block, means for causing the base block to be held in gripping engagement with the depending ends of said ribs and means for connecting the blocks together for the purpose set forth.

13. In a mold of the character described, a base block provided with a central longitudinal channel and having side pieces adapted to be forced inwardly, a side block provided on its inner face with integral ribs the lower ends of which are adapted to fit into the channel of the said base block, a second side block adapted to be secured to the first mentioned side block, means for securing the said side blocks together, means for detachably securing the side blocks to the base block, and means for forcing the side pieces of the said base block inwardly.

14. In a mold of the character described; a base block having a central longitudinal channel and tongue and side pieces integrally connected to said tongue by spring webs; a side block adapted to fit on one of the side pieces of the said base block and provided with ribs on its inner face the lower ends of which are adapted to fit into the channel of the base block and are thicker than the body portions thereof, the said ribs ending a short distance from the upper edge of the said side block; a second side block adapted to fit on the other side piece of the said base block and to be secured to the first mentioned side block so as to tightly engage the inner faces of the ribs carried thereby with its inner face, the said block being provided with lugs at its upper edge adapted to fit over the upper ends of the ribs of the first mentioned side block and to engage the inner face thereof; means for securing the said side blocks together; means for detachably securing the side blocks to the base block; and means for forcing the side pieces of the said base block inwardly.

15. In combination, a base block provided with a central longitudinal channel and having side pieces adapted to be forced inwardly, a side block provided on its inner face with integral ribs the lower ends of which are adapted to fit into the channel of the said base block, a second side block adapted to be secured to the first mentioned side block, means for securing the side blocks together, means for detachably securing the said side blocks to the base block, and means for forcing the side pieces of the base block inwardly.

In witness whereof, I hereunto subscribe my name to this specification in the presence of two witnesses.

LEO M. FINK.

Witnesses:
A. BASTIEN,
WILLIAM C. LINTON.

Copies of this patent may be obtained for five cents each, by addressing the "Commissioner of Patents, Washington, D. C."